United States Patent [19]

Weissberger et al.

[11] Patent Number: 4,666,959
[45] Date of Patent: May 19, 1987

[54] RADIATION STERILIZABLE PROPYLENE POLYMER COMPOSITIONS AND ARTICLES MANUFACTURED THEREFROM

[75] Inventors: Paula S. Weissberger, Albany, N.Y.; Bennie M. Lucas, Odessa, Tex.

[73] Assignee: El Paso Products Company, Odessa, Tex.

[21] Appl. No.: 807,139

[22] Filed: Dec. 10, 1985

[51] Int. Cl.[4] .......................... C08K 5/52; C08K 5/34; C08K 5/49; G21F 1/10
[52] U.S. Cl. .................................. 523/137; 524/102; 524/120; 524/508; 524/518
[58] Field of Search ............... 524/518, 108, 120, 102, 524/508; 523/137

[56] References Cited

U.S. PATENT DOCUMENTS

| | | | |
|---|---|---|---|
| 4,000,101 | 12/1976 | McNally | 524/128 |
| 4,524,165 | 6/1985 | Musser et al. | 524/102 |
| 4,569,736 | 2/1986 | Kosegaki et al. | 524/102 |
| 4,578,410 | 3/1986 | Takahashi et al. | 524/102 |

*Primary Examiner*—Herbert J. Lilling
*Attorney, Agent, or Firm*—Fred S. Valles; Margareta LeMaire

[57] ABSTRACT

A propylene polymer molding composition which is resistant to discoloration and losses in physical properties upon sterilization by high energy radiation is comprised of a blend of a propylene polymer with small amounts of a polymeric hindered amine, an alkyl phosphite and a specific hindered phenolic antioxidant as necessary additives.

20 Claims, No Drawings

RADIATION STERILIZABLE PROPYLENE POLYMER COMPOSITIONS AND ARTICLES MANUFACTURED THEREFROM

BACKGROUND OF THE INVENTION

This invention relates to compositions of propylene polymers suitable for high energy radiation treatment and to articles manufactured from such polymer compositions.

Propylene polymers, and specifically those of a substantial crystalline content have been applied to many new uses, which uses have required that the polymer be processed or treated in a particular manner. For example, propylene polymers generally have the contact clarity, heat distortion resistance and low chemical reactivity required by manufacturers of medical single-use items such as syringes, forceps, surgical clamps and various instrument trays, etc. used in the operating room. Obviously, before any such articles can be safely used, it is required that it be sterilized.

Ethylene oxide has the sterilizing effectiveness needed by these same manufacturers, and has been regarded in the past as generally safe. Recently, however, ethylene oxide has come under increasing scrutiny by the authorities, since it is believed to be a mutagen and possibly a carcinogen. Acceptable limits of residual ethylene oxide and its by-products have, therefore, been lowered. In addition, the cost of ethylene oxide is rising and the sterilizing costs (because of a 14-day holding requirement and the individual batch testing requirement) are becoming non-competitive.

High energy radiation, on the other hand, leaves no residue and has a dose-related sterilization rate which permits immediate release upon certification of the dose. However unlike ethylene oxide, radiation, especially gamma radiation, damages the polymer in that it causes either embrittlement or discoloration or both of these effects occur simultaneously. As disclosed in U.S. Pat. No. 3,537,967, the discoloration is attributable to the use of phenolic antioxidants in the compositions to prevent or minimize the radiation-induced degradation of the polymer. Even worse discoloration is obtained with additive systems containing phenolic antioxidants and a thiodipropionic ester synergist. The patent teaches that discoloration resistance upon high energy radiation is achieved by the incorporation into the polymer of the thiodipropionic ester as the sole stabilizer. However, these compositions have been found not to be entirely satisfactory, especially for use in the fabrication of syringes in that the strength retention (flexural strength) of the irradiated polymer is minimal, even at high levels of thiodipropionic ester incorporation and the sterilized articles become so embrittled that they are prone to breakage in use.

European Pat. No. 7736 teaches that if certain hindered amines are incorporated into a polyolefin, such as propylene homopolymer, there is obtained an improvement in resistance to discoloration which occurs as a result of gamma radiation. The patent discourages the use of phenolic antioxidants in the composition since they are likely to cause aggravated discoloration. However, the absence of an antioxidant will result in processing problems during molding, and sterilized articles manufactured from the composition will lack the required shelf life.

It is, therefore, an object of the present invention to provide novel compositions of matter of polymers of propylene which are resistant to discoloration and to degradation of physical properties upon high energy treatment.

It is a further object of this invention to provide shaped articles of polymers of propylene which can be used for medical or food packaging purposes, which shaped articles will be subjected to a sterilizing dose of high energy radiation.

THE INVENTION

In accordance with the present invention, there is provided a high energy radiation sterilizable propylene polymer composition comprising a propylene polymer resin containing:

(a) from about 0.2 to about 2.0 wt % based on the weight of the polymer resin of a hindered amine which is the polycondensation product of a dialkylsubstituted alkanedioic acid with a 4-hydroxy-2,2,6,6-tetraalkyl-piperidine alkanol, the product having the general formula

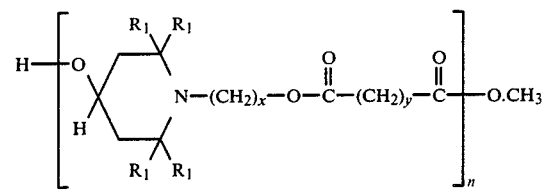

wherein $R_1$ is an alkyl group containing from 1 to 3 carbon atoms, x and y each integers from 2 to 4 and n is an integer from 5 to 20;

(b) from about 0.02 to about 1.0 wt % based on the weight of the propylene polymer of a di(alkyl)-pentaerythritol diphosphite having the general formula

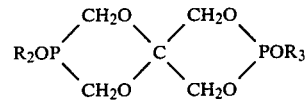

wherein $R_2$ and $R_3$, independently from each other, are alkyl groups containing from 10 to 30 carbon atoms, and (c) from about 0.01 to about 0.5 wt % based on the weight of the propylene polymer of a hindered phenolic antioxidant having the general formula

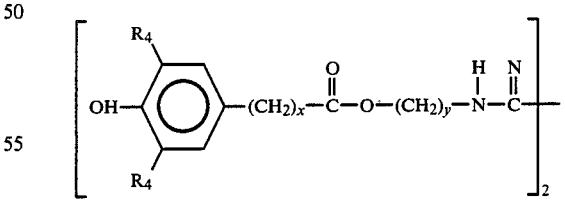

wherein $R_4$ is a group selected from isopropyl, t-butyl or isoamyl, and x and y are each an integer from 2 to 4.

The propylene polymer resin can be a propylene homopolymer, a random copolymer of propylene and ethylene containing from about 0.5 to about 6 wt %, preferably from about 1 to about 5 wt %, polymerized ethylene or a mixture of the homopolymer and copolymer. The propylene polymer resin can also contain other polymers in minor proportions such as ethylene polymers and, in particular, linear low density polyethylene (LLDPE) which are copolymers of ethylene and at least one $C_4$–$C_{18}$ alpha-olefin and which have densities in the range from about 0.910 to about 0.935 gm/cc. Preferably the alpha-olefin comonomer contains from 4 to 8 carbon atoms per molecule. Examples of especially suitable comonomers are butene-1, pentene-1, hexene-1, 4-methyl-pentene-1, heptene-1, octene-1 and mixtures thereof such as butene-1/hexene-1 and butene-1/octene-1, etc. These LLDPE resins can be produced by any of the recently introduced catalytic processes using vapor, solution or slurry techniques at low to medium pressures or high pressure catalytic polymerization in autoclave or tubular reactors. The resin preferably has a density of from about 0.910 to about 0.920. A variety of suitable resins are commercially available within the required density.

A particularly preferred propylene polymer resin is one comprised from about 0 to about 50 wt % of propylene homopolymer, from about 40 to about 97 wt % of a random propylene/ethylene copolymer and from about 3 to about 10 wt % of a linear low density polyethylene. Upon radiation treatment, there occurs simultaneously a certain amount of scission as well as of cross-linking of the polymer molecules resulting in a desirous improvement in the strength properties of the resin, e.g. in crush resistance.

The preferred hindered amines are those wherein $R_1$ is methyl, x and y are both 2 and n is between 5–20. Such compounds are commercially available. These amines are suitably added to provide a concentration in the polymer between about 0.1 and about 0.4.

The $R_2$ and $R_3$ alkyl groups of the di(substituted)pentaerythritol diphosphite preferably contain from 12 to 18 carbon atoms and are suitable selected from lauryl, palmitic or stearyl groups. The preferred concentration of the diphosphite is between about 0.05 and about 0.2 wt % based on the polymer weight.

The preferred hindered phenolic antioxidant is one where $R_4$ is t-butyl and x and y are both 2 and its concentration in the polymer is preferably maintained from about 0.03 to about 0.15 wt %.

It was unexpectedly found that when the above-mentioned three specific additives were incorporated in the propylene polymer resin, the subsequent high energy radiation treatment at up to 5 megarads caused, at most, a negligible increase in resin yellowness. Substitution of the alkyl diphosphite of this invention with any of the commonly available phenyl phosphites will cause the formation of chromophores on irradiation while the use of thioester instead of the alkyl diphosphite causes odor problems due to the presence of catalyst residues in the resin. Also, as recognized in the prior art, most phenolic antioxidants cause an unacceptable increase in yellowness, e.g. the use of [3,5-di-tertiary-butyl-4-hydroxybenzyl monoethyl phosphonate] (Irganox ®1425) instead of the specific antioxidant of this invention, resulted in very yellow radiation-sterilized molded test samples. Omission of the antioxidant entirely from the propylene polymer resin causes an uncontrolled increase in melt flow properties during extrusion of the resin due to thermal degradation. Also, the absence of the antioxidant will severely reduce the shelf life of the radiation treated end product.

In addition to the aforementioned three essential additive components of the composition of this invention, other additives may also be included. For instance, a catalyst residue neutralizer is usually required when the polymer resin has been prepared by polymerization in the presence of one of the newly developed, highly active catalysts, since the use of such catalysts obviates the need for a separate polymer deashing step. The neutralizer is typically added in quantities between about 0.02 and about 0.20 wt % based on the polymer weight.

Other optional additives include coloring agents, lubricants, clarifying and/or nucleating agents, melt flow modifying agents and others. The latter two mentioned agents are usually added in concentrations ranging respectively from 0.02 to 0.40 wt % and from 0.005 to 0.2 wt %.

The resin blend can be processed into molded articles by various techniques such as blow molding and injection molding. The composition is especially suitable for the production if disposable hypodermic syringes, medicine vials and other radiation sterilizable articles used for medical purposes. The composition is also used with advantage in food packaging applications such as retort packaging where radiation treatment is used to prevent unwanted growth of microorganisms.

The high energy radiation is conveniently provided by a cobalt 60 source. Other radiation treatment, however, can be used such as high energy x-rays or high energy electrons (beta radiation). In general, radiation dosages that can be applied range up to about 5 megarads. For sterilization purposes, it has been found that an article of manufacture such as a syringe can be effectively sterilized by applying 1.5 megarads under gamma radiation.

The following examples illustrate the invention without limiting its scope.

EXAMPLES 1–6

Compositions were prepared from the compounds described below in the amounts shown in Table I.

The propylene homopolymer was an undeashed resin prepared in the presence of a high-activity magnesium chloride-supported titanium chloride catalyst and an organoaluminum cocatalyst. The polymer of Example 1 had a melt flow rate of about 12, while that of Examples 2–6 had an initial melt flow rate of about 4.

The random propylene polymer component was an undeashed copolymer containing 1.8 wt % polymerized ethylene on an average. The melt flow of the polymer was about 9 g/10 min at 230° C. and 2.16 kg load.

The following additives were incorporated in various amounts into the resin or blend of resins:
(a) aluminum magnesium hydroxycarbonate (KYOWA DHT-4A) for neutralizing the acidic catalyst residues in the undeashed propylene polymer,
(b) Tinuvin ®622 LD (CIBA-GEIGY), a dimethylsuccinate polymer with 4-hydroxy-2,2,6,6-tetramethyl-1-piperidineethanol,
(c) Weston ®619 which is di(stearyl)pentaerythritol diphosphite,
(d) NAUGARD ®XL-1 which is a hindered phenolic antioxidant and metal deactivator chemically defined as 2,2'-oxamidobis-ethyl-3-(3,5-di-tert-butyl-4-hydroxyphenyl)propionate,
(e) Lupersol ®101, which is a di-t-butylperoxide used as a melt flow medifier to obtain a resin of controlled rheology,
(f) sodium benzoate as a nucleating agent (added as a solution in n-propanol-water azeotrope) and
(g) Millad ®3905, dibenzylidene sorbitol, a clarifying agent.

Tensile bar specimens (2½"×½"×60 mil) were prepared from each of these blends and were then subjected to gamma radiation with doses of 0, 1.5, 2,5–2.7 and 3.5–3.7 megarads respectively employing a cobalt 60 source.

The yellowness (visual) and the initial tensile properties (ASTM D-1708) were determined. The pertinent data are shown in Table I below.

TABLE I

| EXAMPLE | 1 | 2 | 3 | 4 | 5 | 6 |
|---|---|---|---|---|---|---|
| Resin | | | | | | |
| Homopolymer - % | 100 | 100 | 100 | 100 | 100 | — |
| Random Copolymer - % | — | — | — | — | — | 100 |
| Additives - ppm | | | | | | |
| KYOWA KHT-4A | 1000 | 1000 | 1000 | 1000 | 1000 | 1000 |
| Tinuvin ® 622 LD | 2000 | 2000 | 1000 | 1500 | 1000 | 1000 |
| Weston ® 619 | 1000 | 1000 | 1000 | 1000 | 1000 | 1000 |
| NAUGARD ® XL-1 | 300 | 300 | 300 | 300 | 300 | 300 |
| Lupersol ® 101 | — | 300 | 300 | 300 | 150 | 150 |
| Sodium Benzoate | — | — | 1000 | — | 1000 | 1000 |
| Millad ® 3905 | — | — | — | 2500 | — | — |
| MFR | 12 | 24.8 | 23.0 | 26.7 | 18.2 | 15.0 |
| Color | Accept. | Accept. | Accept. | Accept. | Accept. | Accept. |
| Tensile Properties - Initial | | | | | | |
| 0 Mrad: | | | | | | |
| Yield, psi | 5220 | 5070 | 4920 | 4890 | 5700 | 4830 |
| Fail, psi | 8590 | 6830 | 6580 | 6920 | 7430 | 7650 |
| % Elongation | 617 | 631 | 615 | 626 | 604 | 639 |
| 1.5 Mrad: | | | | | | |
| Yield, psi | 5180 | 4890 | 4950 | 4920 | 5650 | 4470 |
| Fail, psi | 7470 | 6440 | 6160 | 6250 | 6630 | 6900 |
| % Elongation | 537 | 627 | 591 | 558 | 551 | 602 |
| 2.5 Mrad: | | | | | | |
| Yield, psi | 5320 | 4890 | 4990 | 5020 | 5630 | 4710 |
| Fail, psi | 7050 | 6090 | 5870 | 5430 | 6520 | 6400 |
| % Elongation | 486 | 598 | 588 | 458 | 551 | 564 |
| 3.5 Mrad: | | | | | | |
| Yield, psi | 5210 | 5020 | 5270 | 4950 | 5710 | 4830 |
| Fail, psi | 6640 | 5860 | 5290 | 5730 | 6370 | 6210 |
| % Elongation | 463 | 592 | 518 | 517 | 528 | 545 |

After three months aging, the tensile properties were again determined on the irradiated samples and the results are shown in Table II. These tests indicated that no age deterioration was discernable.

TABLE II

| EXAMPLE | 2 | 3 | 4 |
|---|---|---|---|
| Tensile Properties - 3 months | | | |
| 0 Mrad: | | | |
| Yield, psi | 5960 | 5500 | 5420 |
| Fail, psi | 6580 | 7050 | 7220 |
| % Elongation | 642 | 621 | 625 |
| 1.5 Mrad: | | | |
| Yield, psi | 5130 | 5530 | 5420 |
| Fail, psi | 5960 | 6420 | 6700 |
| % Elongation | 608 | 593 | 601 |
| 2.5 Mrad: | | | |
| Yield, psi | 5210 | 5340 | 5570 |
| Fail, psi | 6140 | 5810 | 6580 |
| % Elongation | 598 | 559 | 571 |
| 3.5 Mrad: | | | |
| Yield, psi | 5300 | 5540 | 5480 |
| Fail, psi | 5920 | 5640 | 5810 |
| % Elongation | 551 | 545 | 475 |

EXAMPLE 7

95 parts by weight of an undeashed propylene/ethylene random copolymer (blended with 9% propylene homopolymer) containing about 3.3 wt % polymerized ethylene was mixed with 5 parts of LLDPE, a random copolymer of ethylene and butene-1 having a density of 0.914 and a melt index of about 2 g/10 min (ASTM D-1238). The resin blend was also mixed with 1000 ppm calcium stearate as a processing aid, 550 ppm of KYOWA ®DHT-4A, 2000 ppm of Tinuvin ®622 LD, 1000 ppm of Weston ®619 and 700 ppm of NAUGARD ®XL-1. The last four additives have been identified in connection with the discussion of Examples 1–6.

Tensile bar specimens were prepared and irradiated with doses of 0, 1.5, 3 and 5 Mrad employing a cobalt 60 source. The melt flow rate and the tensile properties were measured on the initially treated samples and after aging. Also, the Yellowness Index (ASTM D-1708) was determined on initially treated and aged samples, of which half had been in daylight and the other half in a dark environment as would occur when the end products are packed and stored in shipping cartons. The test results are shown in Table III.

TABLE III

| Age - Weeks | 0 | 18 |
|---|---|---|
| 0 Mrad | | |
| YI (light) | −1.73 | −1.23 |
| YI (dark) | −1.65 | −1.67 |
| MFR | 7.2 | 7.0 |
| Tensile @ Yield, psi | 3910 | — |
| % Elongation | >700 | — |
| 1.5 Mrad | | |
| YI (light) | 1.72 | 1.12 |
| YI (dark) | 1.78 | 2.96 |
| MFR | 31.0 | 42.5 |
| Tensile @ Yield, psi | 3940 | 4050 |
| % Elongation | >700 | >700 |
| 3.5 Mrad | | |
| YI (light) | 3.18 | 1.48 |
| YI (dark) | 3.18 | 4.10 |
| MFR | 53.0 | 55.6 |
| Tensile @ Yield, psi | 3980 | 4100 |
| % Elongation | >700 | 660 |
| 5.0 Mrad | | |
| YI (light) | 5.0 | 1.46 |

TABLE III-continued

| Age - Weeks | 0 | 18 |
|---|---|---|
| YI (dark) | 5.03 | 5.30 |
| MFR | 45.0 | 48.5 |
| Tensile @ Yield, psi | 4000 | 4110 |
| % Elongation | 580 | 530 |

It is to be understood that many modifications can be made to the compositions described above without altering the scope of the invention which is defined by the claims.

What is claimed is:

1. A high energy radiation sterilizable propylene polycomposition comprising a propylene polymer mixture of from about 0 to about 50 wt % of propylene homopolymer, from about 40 to about 97 wt % of a random copolymer of propylene and ethylene and from about 3 to about 10 wt % of a linear low density copolymer of ethylene and at least one $C_4$–$C_{18}$ alpha-olefin having a density in the range from about 0.910 to about 0.935 gm/cc, said composition containing (a) from about 0.02 to about 2.0 wt % based on the weight of the propylene polymer of a hindered amine which is the polycondensation product of a dialkyl-substituted alkanedioic acid with a 4-hydroxy-2,2,6,6-tetraalkylpiperidine alkanol, the product having the general formula

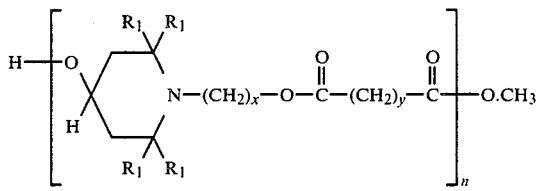

wherein $R_1$ is an alkyl group containing from 1 to 3 carbon atoms, x and y are each integers from 2 to 4 and n is an integer from 5 to 20;

(b) from about 0.02 to about 1.0 wt % based on the weight of the propylene polymer of a di(alkyl)pentaerythritol diphosphite having the general formula

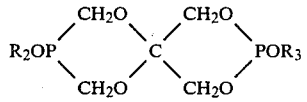

wherein $R_2$ and $R_3$, independently from each other, are alkyl groups containing from 10 to 30 carbon atoms, and (c) from about 0.01 to about 0.5 wt % based on the weight of the propylene polymer of a hindered phenolic antioxidant having the formula

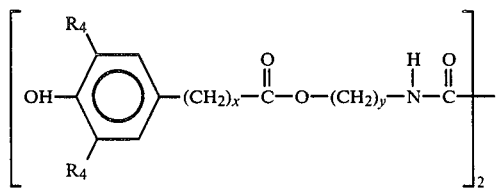

wherein $R_4$ is a group selected from isopropyl, t-butyl or isoamyl and x and y are each an integer from 2 to 4.

2. The composition of claim 1, wherein the concentration of component (a) is between about 0.1 and about 0.4 wt % based on the weight of the propylene polymer.

3. The composition of claim 1, wherein the concentration compound (b) is between about 0.05 and about 0.2 wt % based on the weight of the propylene polymer.

4. The composition of claim 1, wherein the concentration of component (c) is between about 0.03 and about 0.15 wt % based on the weight of the propylene polymer.

5. The composition of claim 1 wherein the propylene polymer is a propylene homopolymer.

6. The composition of claim 1 wherein at least a major proportion of the propylene polymer is a random copolymer of propylene and ethylene containing from about 0.5 to about 6 wt % polymerized ethylene.

7. The composition of claim 6 wherein the polymerized ethylene content of the random copolymer is from about 1 to about 5 wt %.

8. The composition of claim 1 wherein the linear low density copolymer is a copolymer of ethylene and at least one $C_4$ to $C_8$ alpha-olefin.

9. The composition of claim 1 wherein the density of the linear low density copolymer is between about 0.910 and 0.920 gm/cc.

10. The composition of claim 1 having added thereto from about 0.005 to about 0.2 wt % of a melt flow modifier based on the weight of the propylene polymer.

11. The composition of claim 10 wherein the melt flow modifier is an organic peroxide.

12. The composition of claim 1 having added thereto from about 0.02 to about 0.4 wt % of a nucleating agent based on the weight of the propylene polymer.

13. The composition of claim 12 wherein the nucleating agent is a metal salt of benzoic acid.

14. The composition of claim 1 having added thereto from about 0.02 to about 0.4 wt % of a clarifying agent based on the weight of the propylene polymer.

15. The composition of claim 14 wherein the clarifying agent is dibenzylidene sorbitol.

16. The composition of claim 1 having added thereto from about 0.02 to about 0.20 wt % of a neutralizing agent based on the weight of the propylene polymer.

17. The composition of claim 16 wherein the neutralizing agent is an aluminum magnesium hydroxycarbonate.

18. An article of manufacture sterilized by gamma irradiation and manufactured from a composition comprising a propylene polymer mixture of from about 0 to about 50 wt % of propylene homopolymer, from about 40 to about 97 wt % of a random copolymer of propylene and ethylene and from about 3 to about 10 wt % of a linear low density copolymer of ethylene and at least one $C_4$–$C_{18}$ alpha-olefin having a density in the range from about 0.910 to about 0.935 gm/cc, said composition containing (a) from about 0.02 to about 2.0 wt % based on the weight of the propylene polymer of a hindered amine which is the polycondensation product of a dialkyl-substituted alkanedioic acid with a 4-hydroxy-2,2,6,6-tetraalkylpiperidine alkanol, the product having the general formula

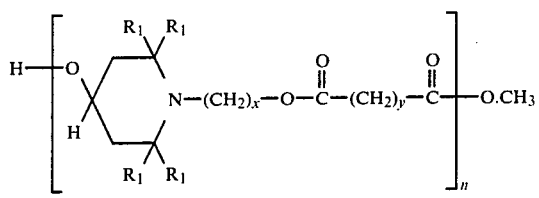

wherein $R_1$ is an alkyl group containing from 1 to 3 carbon atoms, x and y are each integers from 2 to 4 and n is an integer from 5 to 20;

(b) from about 0.02 to about 1.0 wt % based on the weight of the propylene polymer of a di(alkyl)pentaerythritol diphosphite having the general formula

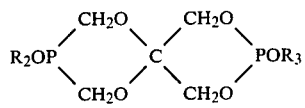

wherein $R_2$ and $R_3$, independently from each other, are alkyl groups containing from 10 to 30 carbon atoms, and (c) from about 0.01 to about 0.5 wt % based on the weight of the propylene polymer of a hindered phenolic antioxidant having the general formula

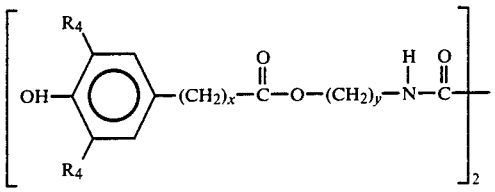

wherein $R_4$ is a group selected from isopropyl, t-butyl or isoamyl and x and y are each an integer from 2 to 4.

19. The article of manufacture of claim 18 wherein at least a major proportion of the propylene polymer is a random copolymer of propylene and ethylene containing from about 0.5 to about 6 wt % polymerized ethylene.

20. The article of manufacture of claim 18 wherein the composition also contains at least one of an additive selected from a melt flow modifier, a nucleating agent or a clarifying agent.

* * * * *